United States Patent [19]

Wijmans

[11] Patent Number: 5,071,451
[45] Date of Patent: Dec. 10, 1991

[54] MEMBRANE PROCESS AND APPARATUS FOR REMOVING VAPORS FROM GAS STREAMS

[75] Inventor: Johannes G. Wijmans, Menlo Park, Calif.

[73] Assignee: Membrane Technology & Research, Inc., Menlo Park, Calif.

[21] Appl. No.: 635,919

[22] Filed: Dec. 28, 1990

[51] Int. Cl.[5] ............................................. B01D 53/22
[52] U.S. Cl. .......................................... 55/16; 55/23; 55/68; 55/158
[58] Field of Search ...................... 55/16, 23, 158, 66, 55/68, 71, 73

[56] References Cited

U.S. PATENT DOCUMENTS

| | | | |
|---|---|---|---|
| 3,903,694 | 9/1975 | Aine | 55/158 X |
| 4,230,463 | 10/1980 | Henis et al. | 55/68 X |
| 4,243,701 | 1/1981 | Riley et al. | 55/158 X |
| 4,386,944 | 6/1983 | Kimura | 55/16 |
| 4,444,571 | 4/1984 | Matson | 55/16 |
| 4,553,983 | 11/1985 | Baker | 55/16 |
| 4,606,740 | 8/1986 | Kulprathipanja | 55/158 X |
| 4,608,060 | 8/1986 | Kulprathipanja et al. | 55/16 |
| 4,654,047 | 3/1987 | Hopkins et al. | 55/16 X |
| 4,772,295 | 9/1988 | Kato et al. | 55/16 |
| 4,840,646 | 6/1989 | Anand et al. | 55/16 |
| 4,857,078 | 8/1989 | Watler | 55/16 |
| 4,906,256 | 3/1990 | Baker et al. | 55/16 |
| 4,931,070 | 6/1990 | Prasad | 55/16 |
| 4,952,219 | 8/1990 | DiMartino, Sr. | 55/16 |
| 4,990,168 | 2/1991 | Sauer et al. | 55/16 X |
| 4,994,094 | 2/1991 | Behling et al. | 55/16 |

FOREIGN PATENT DOCUMENTS 3824400  1/1990  Fed. Rep. of Germany .......... 55/16

OTHER PUBLICATIONS

S. S. Kremen, "Technology and Engineering of ROGA Spiral Wound Reverse Osmosis Membrane Modules", *Reverse Osmosis & Synthetic Membranes*, S. Sourirajan (Ed.), National Research Council of Canada, Ottawa, 1977, pp. 371–385 (Chapter 17).

Y. Sindo et al., "Calculation Methods for Multicomponent Gas Separation by Permeation", *Separation Science & Technology*, 20(5&6), pp. 445–459, 1985.

Primary Examiner—Robert Spitzer
Attorney, Agent, or Firm—J. Farrant

[57] ABSTRACT

A membrane process and system for removing condensable vapors from gas streams is disclosed. The process includes a membrane separation step and a condensation or other recovery step. An auxiliary membrane module or set of modules is installed across the pump and condenser on the downstream side of the main membrane unit. This module takes as its feed the vent gas from the condenser, and returns a vapor-enriched stream upstream of the pump and condenser. The module can be sized to produce a discharge stream containing the vapor in about the same concentration as the feed to be treated. This discharge stream can then be mixed with the feed without diverse effect on the efficiency of the system.

22 Claims, 4 Drawing Sheets

MEMBRANE PROCESS AND APPARATUS FOR REMOVING VAPORS FROM GAS STREAMS

BACKGROUND OF THE INVENTION

Gas streams containing condensable vapors, such as water vapor, sulfur dioxide, ammonia or organic vapors, arise from numerous industrial and commercial processes. One method of removing the vapor from the gas stream is by means of a membrane separation step, followed by condensation of the vapor-enriched stream from the membrane separation step.

A typical membrane vapor separation system includes a membrane unit, a pump for lowering the pressure on the permeate side of the membrane, and a condenser for liquefying the vapor. Membrane processes for removing vapors from gas streams are described, for instance, in U.S. Pat. Nos. 3,903,694, 4,553,983 and 4,906,256, which all deal with removal of organic vapor from air or other gases, U.S. Pat. No. 4,444,571, which deals with removal of water vapor from gas streams, and U.S. Pat. Nos. 4,606,740 and 4,608,060, which describe membranes for removing polar gases such as hydrogen sulfide, sulfur dioxide and ammonia from other gases.

Co-owned and co-pending application Ser. No. 432,592, now abandoned and replaced by continuation application Ser. No. 649,305 describes numerous schemes for combining membrane separation with condensation in a complementary way to achieve efficient removal and/or recovery of a condensable component having a boiling point of $-100°$ C. from a gas mixture.

In a vapor removal process characterized by membrane separation followed by condensation, the vapor concentration in the condenser vent gas after the condensation step depends on the vapor/liquid equilibrium at the operating conditions under which the condensation is performed. It is frequently the case that the condenser vent gas contains a much higher concentration of vapor than the original feed gas. The vent gas is often recirculated to the feed side of the membrane unit for further treatment. This type of scheme, performed via an oven, is shown for example, in U.S. Pat. No. 4,553,983.

There are several problems associated with returning the condenser vent gas to the membrane feed. First, the more concentrated is the vent gas compared with the feed gas, the less efficient the system becomes. Suppose, for example, the feed gas contains 2% vapor, the vapor-enriched stream from the membrane separation step contains 20% vapor, and the vent gas from the condenser contains 10% vapor. Then about half of the amount of vapor removed and concentrated by the membrane is recirculated to the front of the membrane. Much of the separation achieved by membrane is then negated, resulting in increased membrane area and pump capacity requirements for the system.

What can be done to handle the condenser vent gas stream is to pass it to a second membrane stage. This stage can be designed to produce a discharge stream with a concentration about the same as the original feed, so as to minimize the impact of the recycled stream on the total process. The vapor-enriched stream from the second membrane stage is in turn condensed, and the vent gas from the second condenser is returned to the feed of the second membrane unit. Such an arrangement is shown, for example, in U.S. Pat. No. 4,906,256, FIG. 3. A two-stage system is complex compared with a one-stage, uses more controls and is more costly, since two sets of most components are needed.

SUMMARY OF THE INVENTION

The invention is a vapor recovery system and process that permits condenser vent gas to be recirculated, using less energy and less membrane area than a one-stage membrane system, and without the complexity and cost of a two-stage system. In the system of the invention, a small auxiliary membrane module or set of modules is installed across the pump and condenser on the downstream side of the main membrane unit. This module takes as its feed the vent gas from the condenser, and returns a vapor-enriched stream upstream of the pump and condenser. If desired, the module can be sized to produce a discharge stream containing the vapor in about the same concentration as the feed to be treated. This discharge stream may then be mixed with the feed without adverse effect on the efficiency of the system.

Using the arrangement of the invention can achieve substantial improvements in the performance and efficiency of a conventional one-stage vapor removal system, without the necessity of resorting to a two-stage system, with attendant complications and cost.

In another aspect, the invention is a system and process that combines membrane vapor separation with any recovery system for the vapor. Besides condensation, the recovery process could be an extraction process, a physical or chemical absorption process or an adsorption process, for example. In each case, waste gas from the recovery process could be passed through the auxiliary module(s) before return to the main membrane unit or elsewhere.

It is an object of the invention to provide a process for removing vapors from gas streams.

It is an object of the invention to improve the performance of membrane vapor removal systems and processes.

It is an object of the invention to provide efficient membrane/condensation vapor removal processes in which the condenser vent gas is recirculated to the membrane unit.

It is an object of the invention to provide membrane/condensation vapor removal processes in which the condenser vent gas composition is adjusted.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

The term vapor as used herein refers to a liquefiable component of a gas stream.

In the process of the invention, a feed gas stream containing a vapor is passed through a membrane separation step and a recovery step. For convenience, the figures and their descriptions show a recovery step achieved by condensation of the vapor. However, other recovery steps, including various kinds of extraction, absorption and adsorption steps are also within the scope of the invention. The vapor may be of an organic compound or mixture of compounds, such as a hydrocarbon, a halogenated hydrocarbon or the like, or an inorganic compound, such as water, sulfur dioxide, ammonia, etc.

The other component or components of the feed gas stream may be other vapors, nitrogen, air or any other gas.

Figure 1:
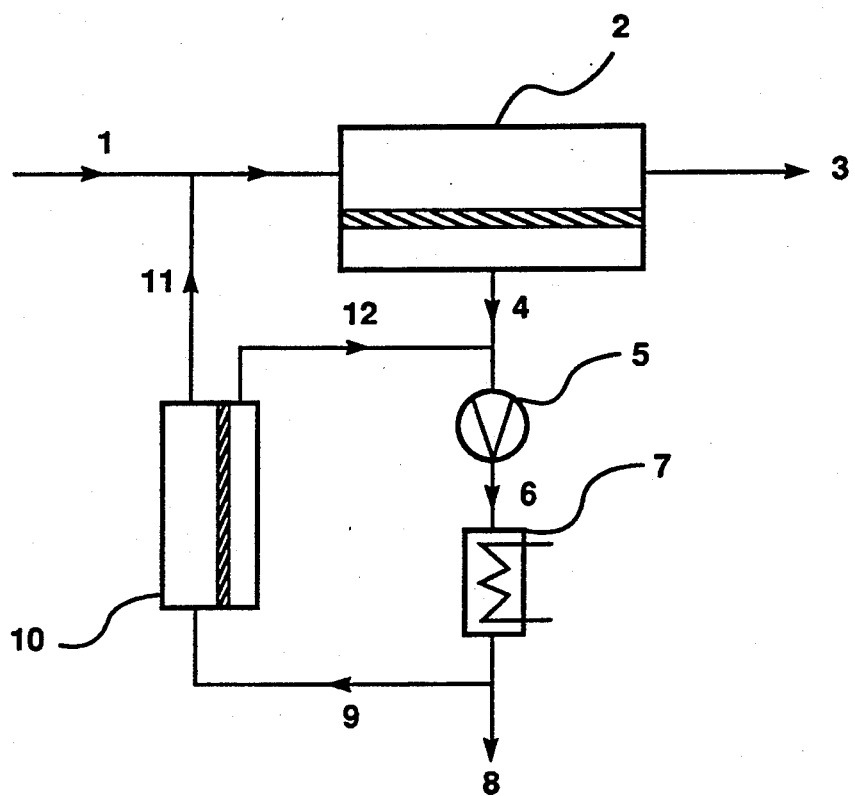
FIG. 1 is a schematic drawing showing a membrane separation process carried out with a system including a main membrane unit, a pump, a condenser and an auxiliary membrane module or modules.

A basic embodiment of the invention is shown in FIG. 1. Referring to this figure, a vapor-containing feed gas stream, 1, passes to a membrane separation unit, 2, containing one or more membranes. The membrane separation step normally involves running the feed gas stream across a membrane that is selectively permeable to the vapor that is to be removed. The vapor is concentrated in the stream, 4, permeating the membrane; the residue, non-permeating, stream, 3, is correspondingly depleted in vapor.

The membrane may take the form of a homogeneous membrane, a membrane incorporating a gel or liquid layer, or any other form known in the art. Two types of membrane are preferred for use in the invention. The first is a composite membrane comprising a microporous support, onto which the permselective layer is deposited as an ultrathin coating. Composite membranes are preferred when a rubbery polymer is used as the permselective material. The second is an asymmetric membrane in which the thin, dense skin of the asymmetric membrane is the permselective layer. Both composite and asymmetric membranes are known in the art. References that teach the production of such membranes include U.S. Pat. Nos. 4,243,701; 4,553,983; 4,230,463; and 4,840,646.

The form in which the membranes are used in the invention is not critical. They may be used, for example, as flat sheets or discs, coated hollow fibers, or spiral-wound modules, all forms that are known in the art. Spiral-wound modules are a preferred choice. References that teach the preparation of spiral-wound modules are S. S. Kremen, "Technology and Engineering of ROGA Spiral Wound Reverse Osmosis Membrane Modules", in *Reverse Osmosis and Synthetic Membranes*, S. Sourirajan (Ed.), National Research Council of Canada, Ottawa, 1977; and U.S. Pat. No. 4,553,983, column 10, lines 40-60. Alternatively the membranes may be configured as microporous hollow fibers coated with the permselective polymer material and then potted into a module.

The driving force for membrane permeation is the pressure difference between the feed and permeate sides. The pressure drop across the membrane can be achieved by pressurizing the feed, by evacuating the permeate or by both. In FIG. 1, the feed gas is supplied to the membrane separation unit at atmospheric pressure or slightly above, and a vacuum pump, 5, is used to lower the pressure on the permeate side.

Stream, 6, from the vacuum pump is subjected to a condensation step. In general, the condensation step may involve chilling, compression or a combination of these. In FIG. 1, the vapor-enriched stream passes without compression to condenser, 7. The condenser may be water cooled, or may employ refrigerants that can take the gas down to lower temperatures, and produces a stream, 8, of liquified vapor.

The amount of vapor that can be removed from the vapor-enriched stream by condensation depends on the vapor concentration, the vapor/liquid equilibrium and the operating conditions under which the condensation is performed. In practice, the economics of achieving extremely high pressures and extremely low temperatures usually limit the performance of the condensation step in recovering liquified vapor. There are also constraints on the removal or recovery achieved by the other types of removal processes.

The non-condensed gas fraction, 9, emerging from the condenser contains a higher vapor concentration than the feed gas, and may contain a concentration as high as five times, 10 times or more than the feed concentration. This condenser vent gas is passed through an auxiliary membrane module or modules, 10, which, like the main membrane separation unit, normally contains a vapor-selective membrane. The volume of the condenser vent gas stream is much smaller than that of the feed gas stream, so the membrane area required for the auxiliary module is small compared with the main unit. The auxiliary module, 10, is connected on its permeate side upstream of the vacuum pump, 6. Thus the driving force for auxiliary membrane permeation is provided by the pressure difference between the vacuum and exhaust sides of the vacuum pump. The concentrated vapor stream, 12, from the auxiliary module joins with vapor-enriched stream, 4, from the main membrane unit and passes again through the vacuum pump and condenser. The residue stream, 11, from the auxiliary unit is recirculated to the feed side of the main membrane unit. The concentration of vapor in the stream 11 depends on the membrane area contained in the auxiliary module. Preferably, the membrane area is such that there is not a big difference between the vapor concentrations in streams 11 and 1. Most preferably, stream 11 should have a concentration about the same as stream 1.

Figure 2:
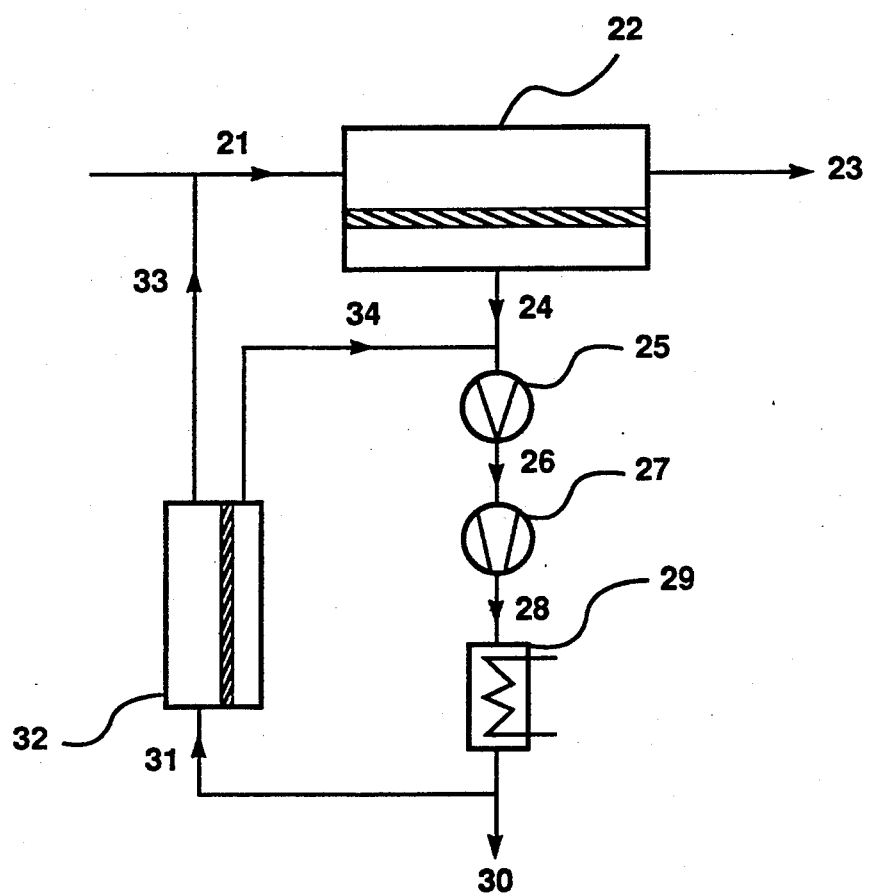
FIG. 2 is a schematic drawing showing a membrane separation process carried out with a system including a main membrane unit, a pump, a compressor, a condenser and an auxiliary membrane module or modules.

An alternative embodiment of the invention is shown in FIG. 2. Referring now to this figure, a vapor-containing feed gas stream, 21, passes to a membrane separation unit, 22, containing one or more membranes. The vapor is concentrated in stream, 24, permeating the membrane; the residue, non-permeating, stream, 23, is correspondingly depleted in vapor.

As in FIG. 1, the driving force for membrane permeation is provided by a vacuum pump, 25, which is used to lower the pressure on the permeate side. Stream, 26, from the vacuum pump is subjected to a condensation step. In this case, the condensation step involves both compression and chilling. The vapor-enriched stream, 26, passes to compressor, 27, emerging as pressurized stream, 28. It is then condensed in condenser, 29, and produces a stream, 30, of liquified vapor.

The non-condensed gas fraction, 31, is passed through an auxiliary membrane module or modules, 32, connected on its permeate side as in FIG. 1, that is, upstream of the vacuum pump, 25. The driving force for auxiliary membrane permeation is provided by the pressure difference between the pressurized exhaust from the condenser and the low-pressure side of the vacuum pump. The concentrated vapor stream, 34, from the auxiliary module joins with vapor-enriched stream, 24, from the main membrane unit and passes again through the vacuum pump, compressor and condenser. The residue stream, 33, from the auxiliary unit is recirculated to the feed side of the main membrane unit. The concentration of vapor in stream 33 may be tailored as discussed above. In this configuration, it would also be possible, although less desirable, to return stream 34 between the vacuum pump and compressor, so that it joined with stream 26.

Figure 3:
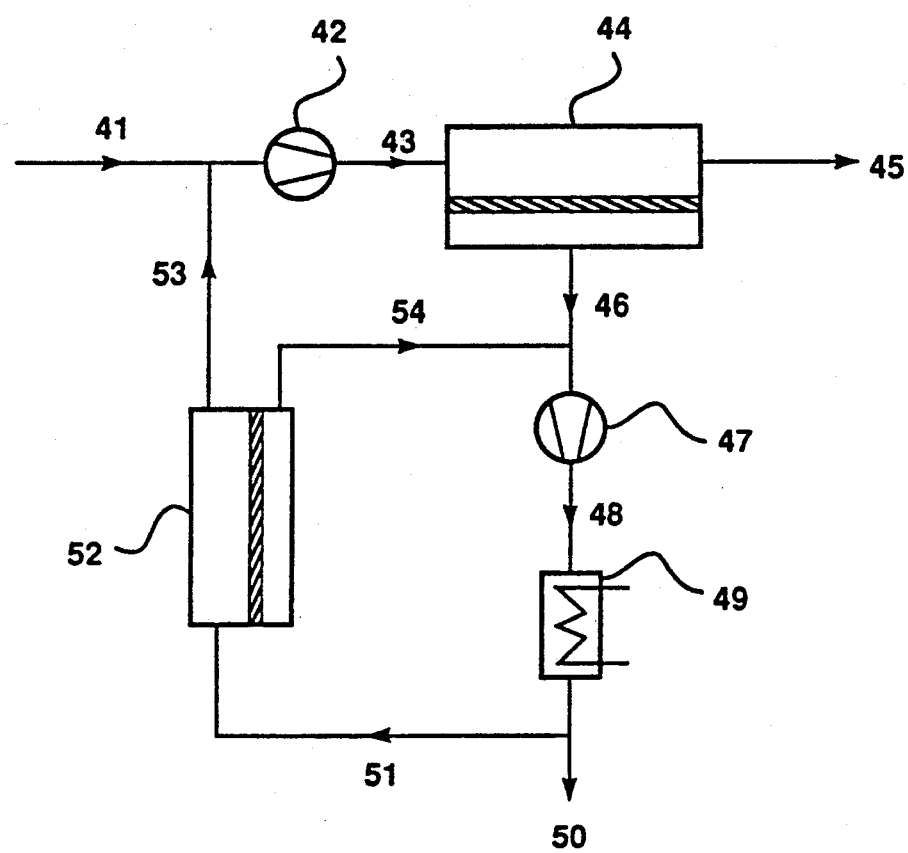
FIG. 3 is a schematic drawing showing a membrane separation process carried out with a system including a compressor, a main membrane unit, a condenser and an auxiliary membrane module or modules.

A third possible embodiment of the invention is shown in FIG. 3. This arrangement differs from those of FIG. 1 and FIG. 2 in that the feed gas stream is supplied to the main membrane unit at high pressure, so it is possible to operate at atmospheric pressure on the permeate side. Referring now to FIG. 3, a vapor-containing feed gas stream, 41, passes to a compressor, 42. Preferably, this raises the feed gas pressure to a value in the range 1-20 atmospheres. Pressurized feed gas stream, 43, then passes to membrane separation unit, 44, containing one or more membranes. The vapor is concentrated in stream, 46, permeating the membrane; the residue, non-permeating, stream, 45, is correspondingly depleted in vapor.

In this case, the driving force for membrane permeation is provided by the pressurized feed; the permeate side of the membrane is at, or close to, atmospheric pressure. Stream, 46, from the membrane passes to compressor, 47, emerging as pressurized stream, 48. It is then condensed in condenser, 49, and produces a stream, 50, of liquified vapor.

The non-condensed gas fraction, 51, is passed through an auxiliary membrane module or modules, 52, connected on its permeate side upstream of compressor, 47. The driving force for auxiliary membrane permeation is provided by the pressure difference between the pressurized exhaust from the condenser and the low-pressure side of the compressor. The concentrated vapor stream, 54, from the auxiliary module joins with vapor-enriched stream, 46, from the main membrane unit and passes again through the compressor and condenser. The residue stream, 53, from the auxiliary unit is recirculated to the feed side of the main membrane unit. The concentration of vapor in stream 53 may be tailored as discussed above.

From the above discussion it may be seen that various ways of providing the driving force for membrane permeation in the main and auxiliary membrane units are possible within the scope of the invention. What is required is that there be some component or set of components on the permeate side of the main membrane unit that changes the pressure of the gas stream passing through it, such as any type of pump, compressor, eductor or the like. What is further required is that at least part of the pressure change caused by that component or components is tapped to provide the driving means for the auxiliary module(s).

FIGS. 1, 2 and 3 all show a one-stage main membrane unit. However, it will be apparent that the same principle can be applied where the main membrane unit includes multiple membrane stages or steps, such as a two-step system, a two-stage system or other combinations.

FIGS. 1, 2 and 3 all show processes in which the residue stream from the auxiliary module(s) is recirculated to the feed side of the main membrane unit. Embodiments in which the residue stream passes to some other destination are also contemplated. In this case, the auxiliary module(s) can be tailored to achieve a residue stream concentration appropriate to that destination.

The systems and processes of the invention could be used for diverse applications, including:

1. Removal of hydrocarbons, particularly $C_3$ to $C_6$ hydrocarbons, from gas streams emitted during storage or transfer of crude oil or gasoline.

2. Removal of CFCs (chlorofluorocarbons) from streams emitted from refrigeration or air conditioning plants, foam manufacture, processes that use CFCs as solvents, CFC manufacture, storage or transfer.

3. Removal of chlorinated solvents from streams generated during chemical manufacture and processing operations, film and laminate preparation, coating and spraying, solvent degreasing, industrial and commercial dry cleaning and many other sources.

The invention is now further illustrated by the following examples, which are intended to be illustrative of the invention, but are not intended to limit the scope or underlying principles in any way.

EXAMPLES

All of the examples compare the removal of a condensable vapor from a feed stream using (A) a one-stage membrane system and (B) a one-stage system fitted with an auxiliary module or modules. The examples are computer calculations, performed using a computer program based on the gas permeation equations for cross flow conditions described by Shindo et al., "Calculation Methods for Multicomponent Gas Separation by Permeation," *Sep. Sci. Technol.* 20, 445-459 (1985). In each case, the feed stream has a flow rate of 100 scfm and the feed is provided to the main membrane separation unit at a pressure of 80 cmHg. The driving force for membrane permeation is assumed to be a vacuum pump on the permeate side of the main membrane separation unit. The selectivity of the membranes for the vapor over the other components of the feed is assumed to be 40. This is a number typical of many vapor separations, such as hydrocarbons from air or nitrogen, chlorinated or fluorinated organic solvents from air or nitrogen, sulfur dioxide from nitrogen, oxygen or other gases, and so on.

The examples are in three groups. The first group assumes a feed concentration of 2% vapor and a concentration in the residue leaving the main membrane unit of 0.5%, in other words 75% removal. The second group also achieves 75% removal, from 4% vapor in the feed to 1% in the residue. The third group achieves 90% recovery, from 5% vapor in the feed to 0.5% in the residue. In each case, the condenser vent gas is assumed to contain 20% vapor, and the auxiliary module membrane area is tailored to achieve a residue stream having a vapor concentration about the same as that of the feed.

GROUP 1 EXAMPLES

Example A

Single-Stage Membrane Separation Unit. Not in Accordance with the Invention

The calculations described above were performed using the following assumptions:

| | |
|---|---|
| Feed concentration: | 2% vapor |
| Feed pressure: | 80 cmHg |
| Feed flow rate: | 100 scfm |
| Membrane selectivity: | 40 |
| Residue concentration: | 0.5% |
| Condenser vent gas concentration: | 20% |

The pressure on the permeate side of the main membrane unit was set to 2 cmHg, 5 cmHg and 10 cmHg. The calculated membrane areas and pump capacities required to achieve the desired performance with a one-stage membrane system are listed in Table 1.

TABLE 1

| Permeate | Membrane Area | | | Pump |
|---|---|---|---|---|
| Pressure (cmHg) | Main Unit ($m^2$) | Aux. Module ($m^2$) | Total ($m^2$) | Capacity (acfm) |
| 10 | 430 | — | 430 | 494 |
| 5 | 163 | — | 163 | 412 |
| 2 | 72 | — | 72 | 505 |

Example B

Single-Stage Membrane Separation Unit with Auxiliary Modules

The calculations described in Example 1A were repeated using a system design as in FIG. 1. The assumptions were as before:

| | |
|---|---|
| Feed concentration: | 2% vapor |
| Feed Pressure: | 80 cmHg |
| Feed flow rate: | 100 scfm |
| Membrane selectivity: | 40 |
| Residue concentration: | 0.5% |
| Condenser vent gas concentration: | 20% |
| Permeate pressure: | 2 cmHg, 5 cmHg and 10 cmHg |

The calculated membrane areas and pump capacities required to achieve the desired performance with a system design as in FIG. 1 are listed in Table 2.

TABLE 2

| Permeate | Membrane Area | | | Pump |
|---|---|---|---|---|
| Pressure (cmHg) | Main Unit ($m^2$) | Aux. Module ($m^2$) | Total ($m^2$) | Capacity (acfm) |
| 10 | 207 | 64 | 271 | 315 |
| 5 | 98 | 15 | 113 | 294 |
| 2 | 50 | 5 | 55 | 401 |

Comparison of Tables 1 and 2 shows that, when the permeate pressure is 10 cmHg for example, the membrane area needed for the process and system of the invention is only 63% of that needed for a conventional one-stage system, and the pump capacity is only 64%. Likewise, when the permeate pressure is 5 cmHg, the membrane area needed for the process and system of the invention is 69% of that needed for a conventional one-stage system, and the pump capacity is 71%. When the permeate pressure is 2 cmHg, the membrane area needed for the process and system of the invention is 76% of that needed for a conventional one-stage system, and the pump capacity is 79%.

Figure 4:
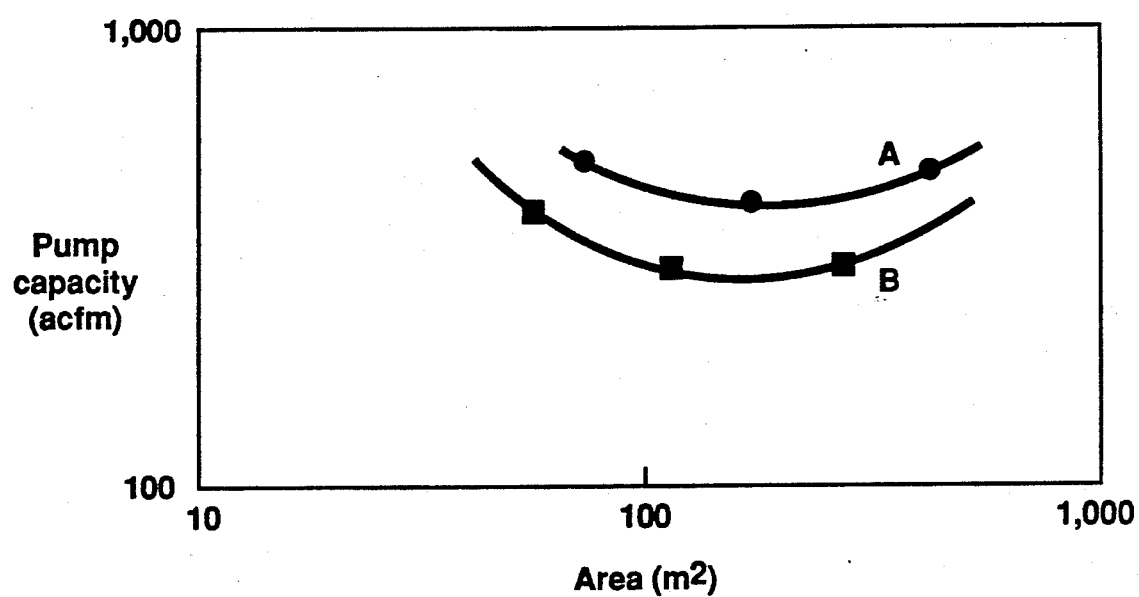
FIG. 4 is a graph showing membrane area and pump capacity required to reduce the vapor concentration in a feed stream from 2% to 0.5% by means of a one-stage membrane process (curve A) and a one-stage process with auxiliary module (curve B).

The comparison of membrane areas and pump capacities for a one-stage system and process (curve A) and for the system and process of the invention (curve B) is shown in graph form in FIG. 4.

GROUP 2 EXAMPLES

Example A

Single-Stage Membrane Separation Unit. Not in Accordance with the Invention

Calculations were performed as in Example 1A, but using the following assumptions:

| | |
|---|---|
| Feed concentration: | 4% vapor |
| Feed pressure: | 80 cmHg |
| Feed flow rate: | 100 scfm |
| Membrane selectivity: | 40 |
| Residue concentration: | 1% |
| Condenser vent gas concentration: | 20% |
| Permeate pressure: | 2 cmHg, 5 cmHg, 10 cmHg |

The calculated membrane areas and pump capacities required to achieve the desired performance with a one-stage membrane system are listed in Table 3.

TABLE 3

| Permeate | Membrane Area | | | Pump |
|---|---|---|---|---|
| Pressure (cmHg) | Main Unit ($m^2$) | Aux. Module ($m^2$) | Total ($m^2$) | Capacity (acfm) |
| 10 | 291 | — | 291 | 350 |
| 5 | 114 | — | 114 | 318 |
| 2 | 54 | — | 54 | 452 |

Example B

Single-Stage Membrane Separation Unit with Auxiliary Modules

The calculations described in Example 2A were repeated using a system design as in FIG. 1. The assumptions were as before:

| | |
|---|---|
| Feed concentration: | 4% vapor |
| Feed pressure: | 80 cmHg |
| Feed flow rate: | 100 scfm |
| Membrane selectivity: | 40 |
| Residue concentration: | 1% |
| Condenser vent gas concentration: | 20% |
| Permeate pressure: | 2 cmHg, 5 cmHg and 10 cmHg |

The calculated membrane areas and pump capacities required to achieve the desired performance with a system design as in FIG. 1 are listed in Table 4.

TABLE 4

| Permeate | Membrane Area | | | Pump |
|---|---|---|---|---|
| Pressure (cmHg) | Main Unit ($m^2$) | Aux. Module ($m^2$) | Total ($m^2$) | Capacity (acfm) |
| 10 | 192 | 36 | 228 | 278 |
| 5 | 88 | 9 | 97 | 278 |
| 2 | 46 | 3 | 49 | 414 |

Comparison of Tables 3 and 4 shows that, when the permeate pressure is 10 cmHg for example, the membrane area needed for the process and system of the invention is only 78% of that needed for a conventional one-stage system, and the pump capacity is only 79%. Likewise, when the permeate pressure is 5 cmHg, the membrane area needed for the process and system of the invention is 85% of that needed for a conventional one-stage system, and the pump capacity is 87%. When the permeate pressure is 2 cmHg, the membrane area needed for the process and system of the invention is 90% of that needed for a conventional one-stage system, and the pump capacity is 91%.

GROUP 3 EXAMPLES

Example A

Single-Stage Membrane Separation Unit. Not in Accordance with the Invention

Calculations were performed as in Example 1A, but using the following assumptions:

| | |
|---|---|
| Feed concentration: | 5% vapor |
| Feed pressure: | 80 cmHg |
| Feed flow rate: | 100 scfm |
| Membrane selectivity: | 40 |
| Residue concentration: | 0.5% |
| Condenser vent gas concentration: | 20% |
| Permeate pressure: | 1 cmHg, 2 cmHg, 5 cmHg, 10 cmHg |

The calculated membrane areas and pump capacities required to achieve the desired performance with a one-stage membrane system are listed in Table 5.

TABLE 5

| Permeate Pressure (cmHg) | Membrane Area | | | Pump Capacity (acfm) |
|---|---|---|---|---|
| | Main Unit (m²) | Aux. Module (m²) | Total (m²) | |
| 10 | 441 | — | 441 | 527 |
| 5 | 179 | — | 179 | 496 |
| 2 | 87 | — | 87 | 711 |
| 1 | 65 | — | 65 | 1155 |

Example B

Single-Stage Membrane Separation Unit with Auxiliary Modules

The calculations described in Example 3A were repeated using a system design as in FIG. 1. The assumptions were as before:

| | |
|---|---|
| Feed concentration: | 5% vapor |
| Feed pressure: | 80 cmHg |
| Feed flow rate: | 100 scfm |
| Membrane selectivity: | 40 |
| Residue concentration: | 0.5% |
| Condenser vent gas concentration: | 20% |
| Permeate pressure: | 1 cmHg, 2 cmHg, 5 cmHg and 10 cmHg |

The calculated membrane areas and pump capacities required to achieve the desired performance with a system design as in FIG. 1 are listed in Table 6.

TABLE 6

| Permeate Pressure (cmHg) | Membrane Area | | | Pump Capacity (acfm) |
|---|---|---|---|---|
| | Main Unit (m²) | Aux. Module (m²) | Total (m²) | |
| 10 | 340 | 50 | 390 | 470 |
| 5 | 152 | 11 | 163 | 454 |
| 2 | 78 | 4 | 82 | 673 |

TABLE 6-continued

| Permeate Pressure (cmHg) | Membrane Area | | | Pump Capacity (acfm) |
|---|---|---|---|---|
| | Main Unit (m²) | Aux. Module (m²) | Total (m²) | |
| 1 | 59 | 3 | 62 | 1111 |

Comparison of Tables 5 and 6 shows that, when the permeate pressure is 10 cmHg for example, the membrane area needed for the process and system of the invention is 88% of that needed for a conventional one-stage system, and the pump capacity is 89%. When the permeate pressure is 5 cmHg, the membrane area needed for the process and system of the invention is 91% of that needed for a conventional one-stage system, and the pump capacity is 91%. When the permeate pressure is 2 cmHg or 1 cmHg, the membrane are needed for the process and system of the invention is about 95% of that needed for a conventional one-stage system, and the pump capacity is 95%.

Comparing Examples 1B, 2B and 3B, it may be seen that the greatest savings in membrane area and pump capacity is achieved when there is the greatest disparity between the vapor concentration in the condenser vent gas and the feed gas.

I claim:

1. A method for increasing efficiency in a membrane separation system for removing vapor from a gas stream, said system including in series a membrane separation unit, a pressure-changing means and a condenser, comprising:
   (a) connecting a permselective membrane to said system in such a way that the driving force for transport through said permselective membrane is provided by said pressure-changing means;
   (b) passing a non-condensed, vapor-containing stream from said condenser across said permselective membrane, thereby producing a depleted stream depleted in vapor compared with said non-condensed, vapor-containing stream and an enriched stream enriched in vapor compared with said non-condensed, vapor-containing stream; and
   (c) passing said enriched stream to a low-pressure side of said pressure-changing means.

2. The method of claim one, wherein said pressure-changing means comprises a vacuum pump.

3. The method of claim one, wherein said pressure-changing means comprises a compressor.

4. The method of claim one, wherein said gas stream is at above atmospheric pressure before entering said membrane separation system.

5. The method of claim one, wherein said depleted stream has about the same vapor concentration as said gas stream.

6. The method of claim 1, further comprising
   (d) recirculating said depleted stream to join said gas stream.

7. A membrane separation process, comprising:
   (a) passing a feed gas stream containing a vapor through a membrane separation unit;
   (b) withdrawing from said membrane separation unit a vapor-enriched stream;
   (c) using a pressure-changing means to increase the pressure of said vapor-enriched stream;
   (d) passing said vapor-enriched stream to a condenser;
   (e) withdrawing from said condenser a non-condensed, vapor-containing stream;

(f) passing said non-condensed, vapor-containing stream across a permselective membrane wherein the driving force for transport through said permselective membrane is provided by said pressure-changing means;

(g) withdrawing from said permselective membrane a depleted stream depleted in vapor compared with said non-condensed, vapor-containing stream;

(h) withdrawing from said permselective membrane an enriched stream enriched in vapor compared with said non-condensed, vapor-containing stream;

(i) passing said enriched stream to a low-pressure side of said pressure-changing means.

8. The method of claim 7, wherein said pressure-changing means comprises a vacuum pump.

9. The method of claim 7, wherein said pressure-changing means comprises a compressor.

10. The method of claim 7, wherein said feed gas stream is at above atmospheric pressure before entering said membrane separation system.

11. The method of claim 7, wherein said depleted stream has about the same vapor concentration as said feed gas stream.

12. The method of claim 7, further comprising:

(j) recirculating said depleted stream to join said feed gas stream.

13. A method for increasing efficiency in a membrane separation system for removing vapor from a gas stream, said system including in series a membrane separation unit, a pressure-changing means and a recovery unit, comprising:

(a) connecting a permselective membrane to said system in such a way that the driving force for transport through said permselective membrane is provided by said pressure-changing means;

(b) passing a non-recovered, vapor-containing stream from said recovery unit across said permselective membrane, thereby producing a depleted stream depleted in vapor compared with said non-recovered, vapor-containing stream and an enriched stream enriched in vapor compared with said non-recovered, vapor-containing stream; and (c) passing said enriched stream to a low-pressure side of said pressure-changing means.

14. The method of claim 13, wherein said depleted stream has about the same vapor concentration as said gas stream.

15. The method of claim 13, further comprising:

(d) recirculating said depleted stream to join said gas stream.

16. A membrane separation process, comprising:

(a) passing a feed gas stream containing a vapor through a membrane separation unit;

(b) withdrawing from said membrane separation unit a vapor-enriched stream;

(c) using a pressure-changing means to increase the pressure of said vapor-enriched stream;

(d) passing said vapor-enriched stream to a recovery unit;

(e) withdrawing from said recovery unit a non-recovered, vapor-containing stream;

(f) passing said non-recovered, vapor-containing stream across a permselective membrane wherein the driving force for transport through said permselective membrane is provided by said pressure-changing means;

(g) withdrawing from said permselective membrane a depleted stream depleted in vapor compared with said non-recovered, vapor-containing stream;

(h) withdrawing from said permselective membrane an enriched stream enriched in vapor compared with said non-recovered, vapor-containing stream;

(i) passing said enriched stream to a low-pressure side of said pressure-changing means.

17. The method of claim 16, wherein said depleted stream has about the same vapor concentration as said feed gas stream.

18. The method of claim 16, further comprising:

(j) recirculating said depleted stream to join said feed gas stream.

19. Apparatus for separating a vapor from a gas stream, comprising:

(a) a membrane separation unit;

(b) a pressure-changing means connected to an outlet from said membrane separation unit;

(c) a recovery unit connected downstream of said pressure-changing means;

(d) a permselective membrane connected to said recovery unit and said pressure-changing means, in such a way that a driving force for transport through said permselective membrane is provided by said pressure-changing means.

20. The apparatus of claim 19, wherein said pressure-changing means comprises a vacuum pump.

21. The apparatus of claim 19, wherein said pressure-changing means comprises a compressor.

22. The apparatus of claim 19, wherein said recovery unit comprises a condenser.

* * * * *